United States Patent
Zheng et al.

(10) Patent No.: US 9,900,355 B2
(45) Date of Patent: Feb. 20, 2018

(54) METHOD, TERMINAL DEVICE, SERVER AND SYSTEM FOR SHARING INFORMATION

(71) Applicant: TENCENT TECHNOLOGY (SHENZHEN) COMPANY LIMITED, Shenzhen (CN)

(72) Inventors: Zhihao Zheng, Shenzhen (CN); Jia Ma, Shenzhen (CN); Huixing Wang, Shenzhen (CN); Yuhong Tian, Shenzhen (CN); Huabin Xu, Shenzhen (CN); Xiaopeng Shen, Shenzhen (CN); Guanghai Wen, Shenzhen (CN); Qianbiao Xiang, Shenzhen (CN); Qiaoyu Xu, Shenzhen (CN); Shuzhan Yang, Shenzhen (CN); Jiawei Lv, Shenzhen (CN); Qing Mao, Shenzhen (CN); Yiting Zhou, Shenzhen (CN); Haoyu Xiao, Shenzhen (CN); Zhu Liang, Shenzhen (CN); Yong Zeng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 166 days.

(21) Appl. No.: 14/749,314

(22) Filed: Jun. 24, 2015

(65) Prior Publication Data
US 2015/0295962 A1 Oct. 15, 2015

Related U.S. Application Data

(63) Continuation of application No. PCT/CN2013/090402, filed on Dec. 25, 2013.

(30) Foreign Application Priority Data

Dec. 25, 2012 (CN) .......................... 2012 1 0571452

(51) Int. Cl.
  *H04L 29/06* (2006.01)
  *G06F 3/16* (2006.01)
  *H04L 29/08* (2006.01)

(52) U.S. Cl.
  CPC ............ *H04L 65/403* (2013.01); *G06F 3/165* (2013.01); *H04L 67/06* (2013.01); *H04L 67/10* (2013.01); *H04L 67/2804* (2013.01)

(58) Field of Classification Search
  CPC ........ F06F 3/165; H04L 65/403; H04L 67/06; H04L 67/10; H04L 67/2804; G06F 3/165;
  (Continued)

(56) References Cited

U.S. PATENT DOCUMENTS 9,679,072 B2 * 6/2017 Boudville ......... G06F 17/30879
2003/0225831 A1 12/2003 Asai
(Continued)

FOREIGN PATENT DOCUMENTS

CN 1665194 A 9/2005
CN 1951086 A 4/2007
(Continued)

OTHER PUBLICATIONS

CN Office Action dated Sep. 20, 2016 re: Application No. 201210571452.6; pp. 1-13; citing: CN1951086A, CN101512638A, CN101958914A, CN102739808A and US2003225831A1.
(Continued)

*Primary Examiner* — Alina N Boutah
(74) *Attorney, Agent, or Firm* — Cantor Colburn LLP

(57) ABSTRACT

According to an example, a first terminal device uploads sharing information to a server, the server sends identification information related to the sharing information to the first terminal device according to the sharing information, and the first terminal device transforms the identification information into a sound signal, and plays the sound signal.

(Continued)

a second terminal device receives the sound signal, parses the sound signal to obtain the identification information, and sends a download request comprising the identifier information to the server. The server sends the sharing information to the second terminal device according to the download request.

16 Claims, 4 Drawing Sheets

(58) Field of Classification Search
CPC .......... G06F 17/30876; G06Q 30/0225; G06Q 20/40
USPC .......... 709/203, 204; 705/14.26, 44; 700/94; 726/6
See application file for complete search history.

(56) References Cited

U.S. PATENT DOCUMENTS

| | | |
|---|---|---|
| 2005/0214728 A1 | 9/2005 | Kikuchi et al. |
| 2007/0288566 A1* | 12/2007 | Murakami ............ G06Q 10/107 709/204 |
| 2011/0101086 A1* | 5/2011 | Yach ...................... G06Q 10/10 235/375 |
| 2012/0084131 A1* | 4/2012 | Bergel .............. G06F 17/30876 705/14.26 |
| 2012/0311165 A1* | 12/2012 | Renschler ........... H04L 63/0492 709/228 |
| 2014/0143338 A1* | 5/2014 | Jung ...................... H04L 67/10 709/204 |
| 2014/0330894 A1* | 11/2014 | Zhao ...................... H04L 67/10 709/203 |
| 2016/0217217 A1* | 7/2016 | Boudville ......... G06F 17/30879 |

FOREIGN PATENT DOCUMENTS

| | | |
|---|---|---|
| CN | 101512638 A | 8/2009 |
| CN | 101958914 A | 1/2011 |
| CN | 102739808 A | 10/2012 |

OTHER PUBLICATIONS

International Search Report dated Apr. 3, 2014 re: Application No. PCT/CN2013/090402; citing: CN 102739808 A, CN 1951086 A and CN 101512638 A.

International Preliminary Report on Patentability and Written Opinion dated Jul. 9, 2015 re: Application No. PCT/CN2013/090402; pp. 1-8; citing: CN102739808A and CN1951086A.

CN Office Action dated Apr. 14, 2014 re: Application No. 10420467000; pp. 1-11; citing: CN1951086A, CN1665194A.

\* cited by examiner

METHOD, TERMINAL DEVICE, SERVER AND SYSTEM FOR SHARING INFORMATION

CROSS REFERENCE TO RELATED APPLICATIONS

This application is a continuation of International Application No. PCT/CN2013/090402, filed on Dec. 25, 2013, which claims priority to Chinese Patent Application No. 201210571452.6, filed on Dec. 25, 2012, the entire contents of all of which said applications are incorporated herein by reference in their entirety for all purposes.

FIELD OF THE INVENTION

The present disclosure relates to Internet technologies, and more particularly, to a method, terminal device, server and system for sharing information.

BACKGROUND OF THE INVENTION

Currently, communications between people are more and more popular. For example, people may share photos or exchange business cards with each other. In this way, a group relationship chain is generated, and people related to the group relationship chain may share other information.

In a procedure of sharing the information, users may directly exchange business cards or photos, or the users may share information by using mobile communication technologies, e.g. a Short Message Service (SMS) or a Multimedia Messaging Service (MMS), or the users may share information by using short-distance communication technologies, e.g. infrared technologies or Bluetooth technologies.

In the above modes of sharing information, operations are cumbersome. In addition, efficiency of information sharing is not high since the information is always shared one-to-one.

SUMMARY OF THE INVENTION

Examples of the present disclosure provide a method, terminal device, server and system for sharing information, so as to improve efficiency of information sharing.

A method, for sharing information includes:
uploading, by a first terminal device, sharing information to a server;
sending, by the server, identification information related to the sharing information to the first terminal device according to the sharing information;
transforming, by the first terminal device, the identification information into a sound signal, and playing the sound signal;
receiving, by a second terminal device, the sound signal, parsing the sound signal to obtain the identification information, and sending a download request comprising the identifier information to the server; and sending, by the server, the sharing information to the second terminal device according to the download request.

A terminal device for sharing information includes:
a communicating module, to upload sharing information to a server and receive identification information related to the sharing information sent by the server;
a signal transforming module, to transform the identification information into a sound signal; and
a playing module, to play the sound signal; the sound signal being parsed by a terminal device receiving the sound signal, and the terminal device sending a download request comprising identification information obtained according to the sound signal to the server to download the sharing information.

A terminal device for sharing information includes:
a communicating module, to receive a sound signal;
a parsing module, to parse the sound signal and obtain identification information; wherein
the communicating module is further to send a download request comprising the identification information to the server, and receive sharing information sent by the server.

A server for sharing information includes:
an assigning module, to send identification information related to sharing information to a first terminal device, after receiving the sharing information sent by the first terminal device; and
a processing module, to send the sharing information to a second terminal device after receiving a download request comprising the identification information from the second terminal device.

A system for sharing information includes: a server, at least one first terminal device and at least one second terminal device; wherein
the first terminal device is to upload sharing information to the server;
the server is to send identification information related to the sharing information to the first terminal device according to the sharing information;
the first terminal device is further to transform the identification information into a sound signal, and play the sound signal;
the second terminal device is to, after receiving the sound signal, parse the sound signal and obtain identification information, and send a download request comprising the identification information to the server; and
the server is further to send the sharing information to the second terminal device according to the download request.

By using the solutions of the present disclosure, cumbersome operations for establishing data connection are avoided in the procedure of the sharing information, e.g. operations for establishing Bluetooth connection are avoid. Further, the user does not need to pay extra costs for sharing information, e.g. costs for SMS or MMS. Therefore, costs are saved for the user, and requirements of the user for automatically establishing a group are satisfied.

DETAILED DESCRIPTION OF THE INVENTION

Figure 1:
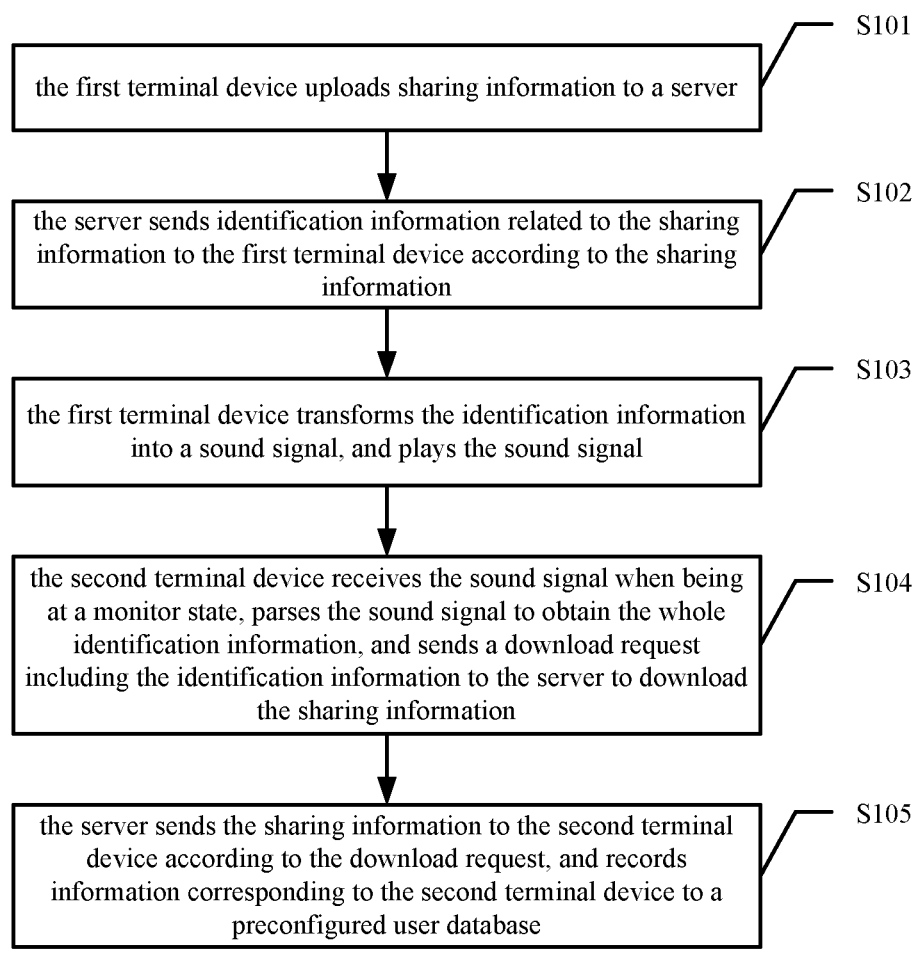
FIG. 1 is a schematic flowchart illustrating a method for sharing information according to an example of the present disclosure.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the embodiments of the present invention in conjunction with the accompanying drawings in FIGS. 1-6. It should be understood that specific embodiments described herein are merely intended to explain the present disclosure, but not intended to limit the present disclosure. In accordance with the purposes of this invention, as embodied and broadly described herein, this invention, in one aspect, relates to method and apparatus for sharing information.

Examples of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones miming the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

FIG. 1 is a schematic flowchart illustrating a method for sharing information according to an example of the present disclosure.

According to an example, a first terminal device is a terminal device initiating information sharing. Information to be shared by the first terminal device may be picture information, business card information, file information and etc. A second terminal device is at least one terminal device needing to obtain information. When a user of the second terminal device wants to obtain information shared by the first terminal device, the user may start a monitor function of the second terminal device to obtain the information shared by the first terminal device automatically.

As shown in FIG. 1, the method includes the following processing.

At S101, the first terminal device uploads sharing information to a server.

According to an example, the sharing information may be picture information, business card information, file information and etc. The first terminal device, under the control of a user, may upload the sharing information to an existing server via a network, e.g. a communication network or the Internet.

At S102, the server sends identification information related to the sharing information to the first terminal device according to the sharing information.

After receiving the sharing information, the server stores the sharing information in a sharing storage, and assigns the identification information for the sharing information of the first terminal device. The identification information includes a type and a storage address of the sharing information. The type of the sharing information may be a picture, a business card, a file and etc. According to an example, the identification information may be 8 bytes of data.

At S103, the first terminal device transforms the identification information into a sound signal, and plays the sound signal.

The first terminal device may transform the identification information into the sound signal by using preconfigured rules, e.g. a rule of alternating high and low frequency. According to an example, the identification information may be transformed into hexadecimal strings, then each string is transformed into one piece of sound signal with alternated high and low frequency, and finally a whole sound signal is generated.

According to an example, the first terminal device plays the sound signal by using a reproducer. For example, a mobile terminal device may play the sound signal by using a reproducer of the mobile terminal device.

According to an example, the first terminal device may play the sound signal for many times, so as to ensure that other terminal devices including the second terminal device can receive the whole sound signal.

According to an example, a start character and/or an end character may be added to the identification information, and then the identification information is transformed into the sound signal, so that the whole identification information may be obtained by the second terminal device according the start character and/or the end character. According to another example, a sound signal with a certain frequency may be added to the sound signal transformed from the identification information, so as to indicate the start and the end of the identification information. The second terminal device determines when to start and when to stop decoding the received sound signal according to the sound signal with the certain frequency.

At S104, the second terminal device receives the sound signal when being at a monitor state, parses the sound signal to obtain the whole identification information, and sends a download request including the identification information to the server to download the sharing information.

When needing to obtain the sharing information of the first terminal device, the user of the second terminal device only needs to start the monitoring function of the second terminal device, so that the second terminal device is at a monitoring state. The sound signal from the first terminal device may be received via a sound module of the second terminal device, e.g. a mike. After receiving the sound signal from the first terminal device, the second terminal device transforms the sound signal into an electronic signal according to rules matching with the rules used by the first terminal device, and thus obtains the identification information.

According to an example, the number of bytes in the identification information of the sharing information sent by the first terminal device is pre-agreed by the first terminal device and other terminal devices. If the number of bytes in the identification information received by the second terminal device is not equal to the pre-agreed number, it is indicated that the received identification information is not complete, and the received identification information is discarded. If the number of bytes in the identification information received by the second terminal device is equal to the pre-agreed number, the download request including the identification information is generated and sent to the server, so as to download the sharing information corresponding to the identification information.

According to an example, the identification information configured by the server has a unified standard format. If the format of the identification information received by the second terminal device is different from the standard format, it is indicated that the received identification information is not complete, and the received identification information is discarded. If the format of the identification information received by the second terminal device is the same as the standard format, the download request including the identification information is generated and sent to the server, so as to download the sharing information corresponding to the identification information.

At S105, the server sends the sharing information to the second terminal device according to the download request, and records information corresponding to the second terminal device to a preconfigured user database.

The server finds the sharing information corresponding to the storage address and the type according to the identification information included in the download request, and sends the sharing information to the second terminal device.

According to an example, if the second terminal device is registered as a sharing user in the server, i.e. the second terminal device authorizes the server to share information corresponding to the second terminal device with other terminal devices, the server automatically records the information of the second terminal device. According to an example, the information of the second terminal device includes identification information of the second terminal device, e.g. a phone number of the second terminal device, sharing information uploaded to the server by the second terminal device, e.g. pictures, business card information. If the second terminal device is not registered as the sharing user, the server does not record the information of the second terminal device.

According to an example, the user database may be configured after the first terminal device uploads the sharing information. The user database stores information of terminal devices downloading the sharing information of the first terminal device in a list mode. After recording the information of all of the second terminal devices, the server may call an information sharing application, i.e. Social Networking Services (SNS), or an Instant Messenger (IM) tool, to generate a group. Users of the terminal devices in the group may communicate with each other.

By using the solutions of the present disclosure, cumbersome operations for establishing data connection are avoided in the procedure of the sharing information, e.g. operations for establishing Bluetooth connection are avoid. Further, the user does not need to pay extra costs for sharing information, e.g. costs for SMS or MMS. Therefore, costs are saved for the user, and requirements of the user for automatically establishing a group are satisfied.

Figure 2:
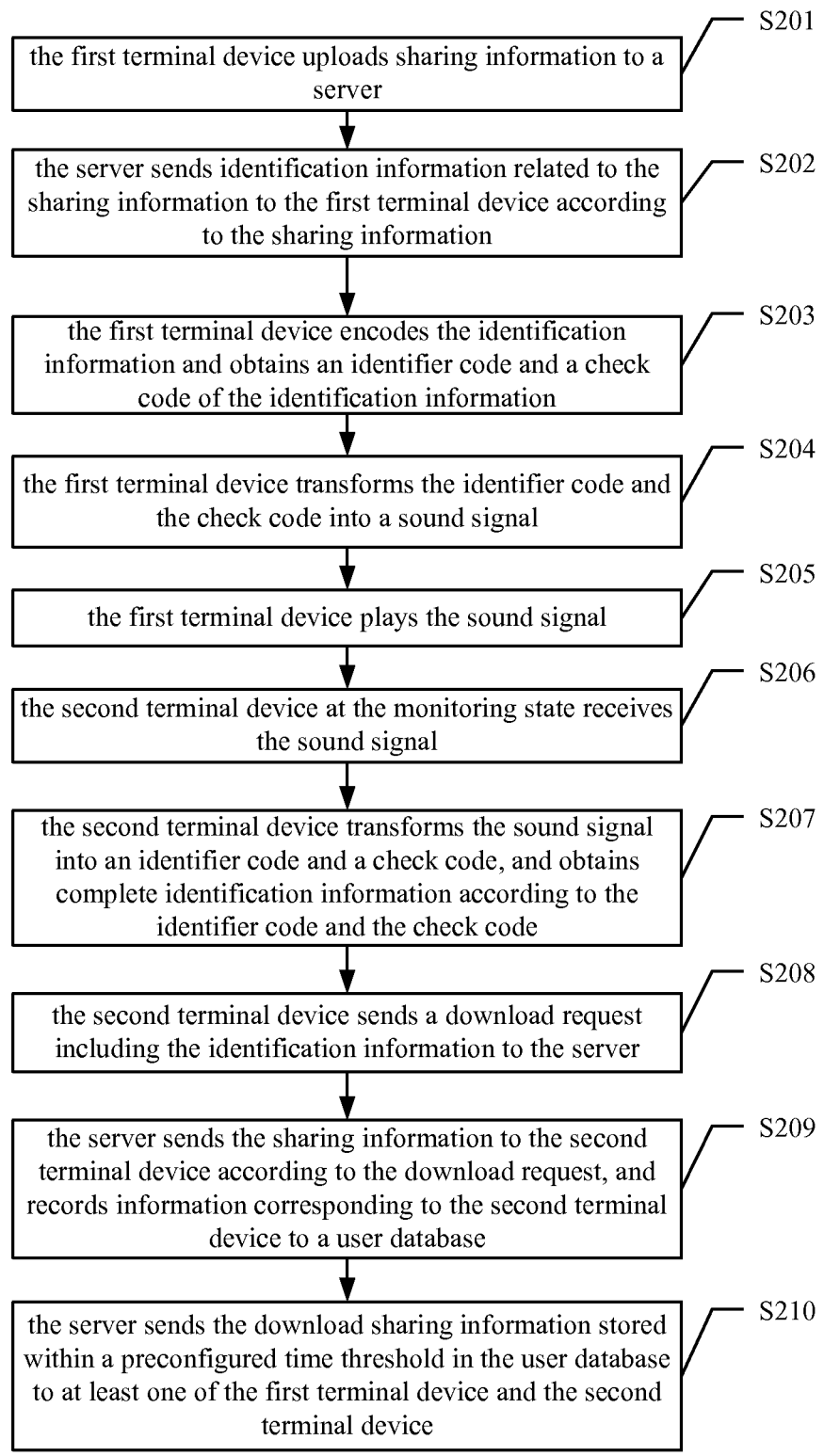
FIG. 2 is a schematic flowchart illustrating a method for sharing information according to another example of the present disclosure.

FIG. 2 is a schematic flowchart illustrating a method for sharing information according to another example of the present disclosure.

According to an example, a first terminal device is a terminal device initiating information sharing. Information to be shared by the first terminal device may be picture information, business card information, file information and etc. A second terminal device is at least one terminal device needing to obtain information. When a user of the second terminal device wants to obtain information shared by the first terminal device, the user may start a monitor function of the second terminal device to obtain the information shared by the first terminal device automatically.

At S201, the first terminal device uploads sharing information to a server.

According to an example, the sharing information may be picture information, business card information, file information and etc. The first terminal device, under the control of a user, may upload the sharing information to an existing server via a network, e.g. a communication network or the Internet.

At S201, the server sends identification information related to the sharing information to the first terminal device according to the sharing information.

After receiving the sharing information, the server stores the sharing information in a sharing storage, and assigns the identification information for the sharing information of the first terminal device. The identification information includes a type and a storage address of the sharing information. The type of the sharing information may be a picture, a business card, a file and etc. According to an example, the identification information may 8 bytes of data.

According to an example, at S202, after receiving the sharing information, the server configures a user database to record download sharing information. The download sharing information includes information of terminal devices downloading the sharing information of the first terminal device. The server assigns unique identification information for the sharing information of the first terminal device, and sends the identification information to the first terminal device. The identification information includes an address for storing the sharing information.

At S203, the first terminal device encodes the identification information and obtains an identifier code and a check code of the identification information.

According to an example, after receiving the identification information from the server, the first terminal device may prompt the user that the identification information is obtained and provide a sending button for the user. If the user clicks the sending button, the first terminal device firstly encodes the identification information by using Reed-Solomon, and obtains the check code of the identification information, and obtains the identifier code of the identification information.

At S204, the first terminal device transforms the identifier code and the check code into a sound signal.

The first terminal device may transform the identification information into the sound signal by using preconfigured rules, e.g. a rule of alternating high and low frequency. According to an example, the identification information may be transformed into hexadecimal strings, then each string is transformed into one piece of sound signal with alternated high and low frequency, and finally a whole sound signal is generated.

At S205, the first terminal device plays the sound signal.

According to an example, the first terminal device plays the sound signal by using a reproducer. For example, a mobile terminal device may play the sound signal by using a reproducer of the mobile terminal device.

According to an example, the first terminal device may play the sound signal for many times, so as to ensure that other terminal devices including the second terminal device can receive the whole sound signal.

According to an example, a start character and/or an end character may be added to the identification information, and then the identification information is transformed into the sound signal, so that the whole identification information may be obtained by the second terminal device according the start character and/or the end character. According to another example, a sound signal with a certain frequency may be added to the sound signal transformed from the identification information, so as to indicate the start and the end of the identification information. The second terminal device determines when to start and when to stop decoding the received sound signal according to the sound signal with the certain frequency.

At S206, the second terminal device at the monitoring state receives the sound signal.

When needing to obtain the sharing information of the first terminal device, the user of the second terminal device only needs to start a monitoring function of the second terminal device, so that the second terminal device is at the monitoring state. The sound signal from the first terminal device may be received via a sound module of the second terminal device, e.g. a mike.

At S207, the second terminal device transforms the sound signal into an identifier code and a check code, and obtains complete identification information according to the identifier code and the check code.

The second terminal device may transform the sound signal into an electronic signal according to rules matching with the rules used by the first terminal device. Then the second terminal device may verify the identifier code by using the check code. If the complete identification information is obtained, processing at S208 is performed. If the complete identification information is not obtained, processing at S206 and SS207 are performed again.

At S208, the second terminal device sends a download request including the identification information to the server to download the sharing information.

According to an example, the processing at S208 is as follows.

After obtaining the complete identification information, the second terminal device checks whether a current network is usable.

If the current network is usable, the second terminal device sends the download request including the identification information to the server to download the sharing information. If the current network is unusable, the second terminal device stores the identification information and/or sends prompt information indicating unusable network download.

If the current network is usable, the sharing information corresponding to the identification information may be directly downloaded from the server according to the identification information. If the current network is usable, the second terminal device may send the download request including the identification information to the server when the network is usable or when the second terminal device is connected to the network again.

It should be noted that, if multiple identification information is obtained according to the received sound signal, the second terminal device may send the download request for each item of the identification information, and the above processing is performed and sharing information corresponding to different identification information is obtained.

In addition, when receiving multiple download requests including the identification information from the second terminal device, the server processes the multiple download requests together and regards them as one download request. According to an example, the first terminal device may send the same sharing information continuously for many times. For example, after a picture is uploaded by the first terminal device, if the second terminal device fails to download the picture from the server according to the identification information in the monitored sound signal, the first terminal device may transform the identification information into the sound signal and play the sound signal continuously for many times. The second terminal device may send multiple download requests according to the identification information obtained from the sound signal received each time. The server may process the multiple download requests together, so that the user of the second terminal device may see one item of the sharing information sent by the first terminal device.

At S209, the server sends the sharing information to the second terminal device according to the download request, and records information corresponding to the second terminal device to a user database.

According to an example, the processing at S209 is as follows.

According to an example, the server searches for and obtains the sharing information of the first terminal device according to the identification information carried in the download request, and sends the obtained sharing information to the second terminal device. When being authorized by the second terminal device, the server may obtain the information of the second terminal device according to a terminal identifier of the second terminal device, and stores the information of the second terminal device into the user database. For example, if the second terminal device is registered as a sharing user in the server, the server records business card information uploaded to the server by the second terminal device into a downloading user list of the user database.

If the information of the second terminal device is not obtained according to the terminal identifier of the second terminal device, only the terminal identifier of the second terminal device may be stored in the user database.

If the second terminal device is not registered as the sharing terminal device, the server may not obtain and record the information of the second terminal device, and may not perform the processing at S210.

At S210, the server sends the download sharing information stored within a preconfigured time threshold in the user database to at least one of the first terminal device and the second terminal device.

The time threshold may be configured by the user according to requirements, e.g. 5 minutes or 10 minutes. The timing of the preconfigured time threshold may be started after the first terminal device uploads the sharing information, or the first terminal device may send an instruction indicating the start of the timing to the server after the user sends the sound signal. When the time threshold is reached, the download sharing information stored in the user database is sent to the first terminal device, so that the user of the first terminal device may know the terminal devices downloading the sharing information of the first terminal device, or the first terminal device may store the information of the terminal devices downloading the sharing information of the first terminal device, i.e. electronic business card, so that the first terminal device may communicate with the terminal devices downloading the sharing information of the first terminal device.

According to an example, the server may always store the download sharing information in the user database, the first terminal device and the second terminal device may sends a record downloading request, so as to download the download sharing information from the user database. According to another example, when the second terminal device sends the download request, the download sharing information may be sent to the second terminal device together with the sharing information. The user database may record the information of the terminal device in a table mode.

By using the solutions of the present disclosure, cumbersome operations for establishing data connection are avoided in the procedure of the sharing information, e.g. operations for establishing Bluetooth connection are avoid. Further, the user does not need to pay extra costs for sharing information, e.g. costs for SMS or MMS. Therefore, costs are saved for the user, and requirements of the user for automatically establishing a group are satisfied.

Figure 3:
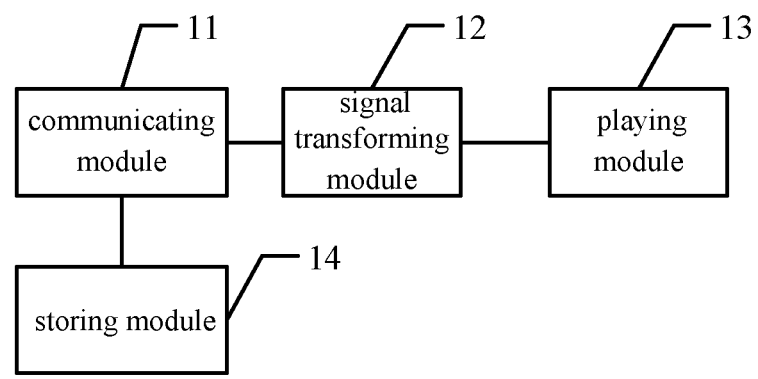
FIG. 3 is a schematic diagram illustrating a structure of a terminal device according to an example of the present disclosure.

FIG. 3 is a schematic diagram illustrating a structure of a terminal device according to an example of the present disclosure.

According to an example, the terminal device may be a mobile terminal device, e.g. a laptop computer, a smart phone, a tablet PC. The terminal device includes hardware modules, e.g. a reproducer, a display and a processor.

According to an example, the terminal device also includes a communicating module 11, a signal transforming module 12 and a playing module 13.

The communicating module 11 is to upload sharing information to a server and receive identification information related to the sharing information sent by the server.

The signal converting module 12 is to transform the identification information into a sound signal.

The playing module 13 is to play the sound signal, so that a terminal device receiving the sound signal may send a download request including the identification information obtained according to the sound signal to the server to download sharing information.

The sharing information includes picture information, business card information, file information and etc. The server may be an application server, e.g. an Instant Massager (IM) server, a SNS server and etc. When a user of the terminal device needs to initiate information sharing, the user may start a sharing function via, e.g. click a sending button, so that the sharing information is uploaded to the server via the communicating module 11.

The signal transforming module 12 may transform the identification information into the sound signal by using preconfigured rules, e.g. a rule of alternating high and low frequency. According to an example, the identification information may be transformed into hexadecimal strings, each string is transformed into one piece of sound signal with alternated high and low frequency, and finally a whole sound signal is generated.

The playing module 13 may play the sound signal by using a reproducer. For example, the playing module 13 in a mobile terminal device may play the sound signal by using a reproducer.

According to an example, the terminal device may play the sound signal for many times, so as to ensure that other terminal devices can receive the whole sound signal.

According to an example, a start character and/or an end character may be added to the identification information, and then the identification information is transformed into the sound signal, so that the whole identification information may be obtained by the other terminal devices according the start character and/or the end character. According to another example, a sound signal with a certain frequency may be added to the sound signal transformed from the identification information, so as to indicate the start and the end of the identification information. The terminal device determines when to start and when to stop decoding the received sound signal according to the sound signal with the certain frequency.

According to an example, the signal transforming module 12 is to encode the identification information and obtains an identifier code and a check code of the identification information.

After the communicating module 11 receives the identification information from the server, the terminal device may prompt the user that the identification information is obtained and provide a sending button for the user. If the user clicks the sending button, the signal transforming module 12 firstly encodes the identification information by using Reed-Solomon, and obtains the check code of the identification information, and obtains the identifier code of the identification information.

According to an example, the terminal device further includes a storing module 14.

The communication module 11 is further to receive download sharing information stored within a preconfigured time threshold in the user database. The download sharing information includes information of terminal devices downloading the sharing information of the terminal device.

The storing module 14 is to store the download sharing information received by the communicating module 11.

The time threshold may be configured by the user according to requirements, e.g. 5 minutes or 10 minutes. The timing of the preconfigured time threshold may be started after the communicating module 11 uploads the sharing information, or the communicating module 11 may send an instruction indicating the start of the timing to the server after the user sends the sound signal. When the time threshold is reached, the download sharing information stored in the user database is sent to the communicating module 11, so that the storing module 14 may store the download sharing information, and thus the user of the terminal device may know the terminal devices downloading the sharing information of the first terminal device, or the terminal device may store the information of the terminal devices downloading the sharing information of the first terminal device, i.e. electronic business card, so that the terminal device may communicate with the terminal devices downloading the sharing information of the terminal device.

According to an example, the download sharing information may be recorded in the user database configured by the server for the terminal device, after the server receives the sharing information of the terminal device. The user database may record the download sharing information in a table mode.

By using the solutions of the present disclosure, cumbersome operations for establishing data connection are avoided in the procedure of the sharing information, e.g. operations for establishing Bluetooth connection are avoid. Further, the user does not need to pay extra costs for sharing information, e.g. costs for SMS or MMS. Therefore, costs are saved for the user, and requirements of the user for automatically establishing a group are satisfied.

Figure 4:
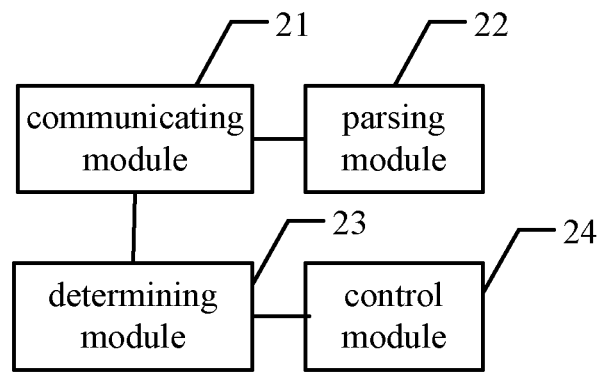
FIG. 4 is a schematic diagram illustrating a structure of a terminal device according to another example of the present disclosure.

FIG. 4 is a schematic diagram illustrating a structure of a terminal device according to another example of the present disclosure.

According to an example, the terminal device may be a mobile terminal device, e.g.

a laptop computer, a smart phone, a tablet PC. The terminal device includes hardware modules, e.g. a reproducer, a display and a processor.

According to an example, the terminal device also includes a communicating module 21 and a parsing module 22.

The communicating module 21 is to receive a sound signal.

The parsing module 22 is to parse the sound signal and obtain identification information.

The communicating module 21 is further to send a download request including the identification information to the server to download sharing information, and receive the sharing information sent by the server.

When needing to obtain sharing information of another terminal device, the user only needs to start a monitoring function of the terminal device, so that the terminal device is at a monitoring state. The communicating module 21 of the terminal device may receive the sound signal from the another terminal device via a sound module, e.g. a mike. After receiving the sound signal from the another terminal device, the parsing module 22 transforms the sound signal into an electronic signal according to rules matching with the rules used by the another terminal device, and thus obtains the identification information.

According to an example, the number of bytes in the identification information of the sharing information sent by the terminal device is pre-agreed by the terminal device and other terminal devices. If the number of bytes in the identification information parsed by the parsing module 22 is not equal to the pre-agreed number, it is indicated that the received identification information is not complete, and the received identification information is discarded. If the number of bytes in the identification information parsed by the parsing module 22 is equal to the pre-agreed number, the download request including the identification information is generated and sent to the server, so as to download the sharing information corresponding to the identification information.

According to an example, the identification information configured by the server has a unified standard format. If the format of the identification information obtained by the parsing module 22 is different from the standard format, it is indicated that the received identification information is not complete, and the received identification information is discarded. If the format of the identification information obtained by the parsing module 22 is the same as the standard format, the download request including the identification information is generated and sent to the server, so as to download the sharing information corresponding to the identification information.

According to an example, if the sound signal carries an identifier code and a check code related to the identification information, the parsing module 22 is to transform the sound signal to obtain the identifier code and the check code, and obtains the complete identification information according to the identifier code and the check code.

The parsing module 22 may transforms the sound signal into an electronic signal according to rules matching with the rules used by the another terminal device, and thus obtains the identifier code and the check code. Then the parsing module 22 verifies the identifier code by using the check code. If complete identification information is obtained, the communicating module 21 is requested to send the download request including the identification information to download the sharing information. If complete identification information is not obtained, the communicating module 21 is requested to receive the sound signal again.

According to an example, the terminal device further includes a determining module 23 to determine whether a current network is usable, after obtaining the complete identification information.

The communicating module 21 is to send the download request including the identification information to the server to download the sharing information, if the current network is usable.

The control module 24 is to store the identification information and/or send prompt information indicating that network download is unusable, if the current network is unusable.

If the current network is usable, the communicating module 21 may directly download the sharing information corresponding to the identification information from the server according to the identification information. If the current network is usable, the communicating module 21 may send the download request including the identification information to the server when the network is usable or when the second terminal device is connected to the network again.

By using the solutions of the present disclosure, cumbersome operations for establishing data connection are avoided in the procedure of the sharing information, e.g. operations for establishing Bluetooth connection are avoid. Further, the user does not need to pay extra costs for sharing information, e.g. costs for SMS or MMS. Therefore, costs are saved for the user, and requirements of the user for automatically establishing a group are satisfied.

Figure 5:
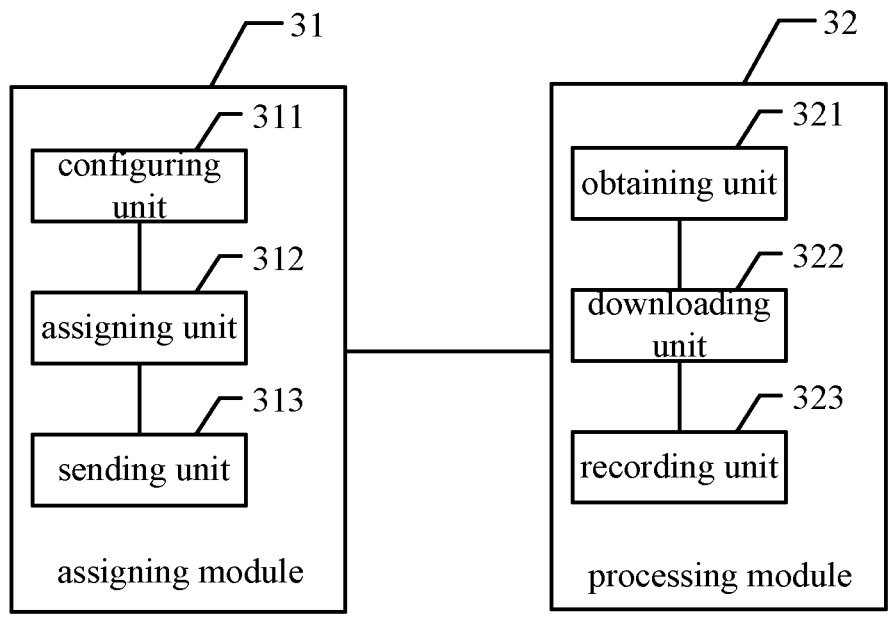
FIG. 5 is a schematic diagram illustrating a structure of a server according to an example of the present disclosure.

FIG. 5 is a schematic diagram illustrating a structure of a server according to an example of the present disclosure.

According to an example, the server may be an application server, e.g. an IM server, a SNS server and etc.

According to an example, the server includes an assigning module 31 and a processing module 32.

The assigning module 31 is to send identification information related to sharing information to a first terminal device, after the sharing information sent by the first terminal device is received.

The processing module 32 is to send the sharing information to a second terminal device after receiving a download request comprising the identification information from the second terminal device; and record information corresponding to the second terminal device to a preconfigured user database.

After receiving the sharing information, the server stores the sharing information in a sharing storage, and assigns the identification information for the sharing information sent by the first terminal device. The identification information includes a type and a storage address of the sharing information. The type of the sharing information includes a picture, a business card, a file and etc. According to an example, the identification information may be 8 bytes of data.

After receiving the identification information, the first terminal device transforms the identification information into a sound signal, and plays the sound signal. after receiving the sound signal, the second terminal device at the monitoring state transforms the sound signal into the identification information, and sends the download request including the identification information to the server.

The processing module 32 finds the sharing information corresponding to the storage address and the type according to the identification information included in the download request, and sends the sharing information to the second terminal device.

According to an example, if the second terminal device is registered as a sharing user in the server, the processing module 32 automatically records the information of the second terminal device. According to an example, the information of the second terminal device includes identification information of the second terminal device, e.g. a phone number of the second terminal device, sharing information uploaded to the server by the second terminal device. If the second terminal device is not registered as the sharing user, the processing module 32 does not record the information of the second terminal device.

According to an example, the user database may be configured after the first terminal device uploads the sharing information. The user database stores information of terminal devices downloading the sharing information of the first terminal device in a list mode. After recording information of all of the second terminal devices, the server may call an information sharing application, i.e. SNS, or an IM tool, to generate a group. Users of the terminal devices in the group may communicate with each other.

According to an example, the assigning module 31 includes a configuring unit 311, an assigning unit 312 and a sending unit 313.

The configuring unit 311 is to configure a user database for recording download sharing information after receiving the sharing information. The download sharing information includes information of terminal devices downloading the sharing information sent by the first terminal device.

The assigning unit 312 is to assign the identification information for the sharing information of the first terminal device.

The sending unit 313 is to send the identification information to the first terminal device, and the identification information includes an address for storing the sharing information.

The processing module 32 includes an obtaining unit 321, a downloading unit 322 and a recording unit 323.

The obtaining unit 321 is to search for and obtain the sharing information of the first terminal device according to the identification information included in the download request.

The downloading unit 322 is to send the obtained sharing information to the second terminal device.

The recording unit 323 is to obtain sharing information corresponding to the second terminal device according to a terminal identifier of the second terminal device, and record the sharing information corresponding to the second terminal device to a preconfigured user database.

According to an example, the sending unit 313 is further to send the download sharing information stored within a preconfigured time threshold in the user database to at least one of the first terminal device and the second terminal device.

The time threshold may be configured by the user according to requirements, e.g. 5 minutes or 10 minutes. The timing of the preconfigured time threshold may be started after the first terminal device uploads the sharing information, or the first terminal device may send an instruction indicating the start of the timing to the server after the user sends the sound signal. When the time threshold is reached, the download sharing information stored in the user database is sent to the first terminal device by the sending unit 313, so that the user of the first terminal device may know the terminal devices downloading the sharing information of the first terminal device, or the first terminal device may store the information of the terminal devices downloading the sharing information of the first terminal device, i.e. electronic business card, so that the first terminal device may communicate with the terminal devices downloading the sharing information of the first terminal device.

According to an example, the server may always store the download sharing information in the user database, the first terminal device and the second terminal device may sends a record downloading request, so as to download the download sharing information from the user database. According to another example, when the second terminal device sends the download request, the download sharing information may be sent to the second terminal device together with the sharing information. The user database may record the information of the terminal device in a table mode.

By using the solutions of the present disclosure, cumbersome operations for establishing data connection are avoided in the procedure of the sharing information, e.g. operations for establishing Bluetooth connection are avoid. Further, the user does not need to pay extra costs for sharing information, e.g. costs for SMS or MMS. Therefore, costs are saved for the user, and requirements of the user for automatically establishing a group are satisfied.

Figure 6:
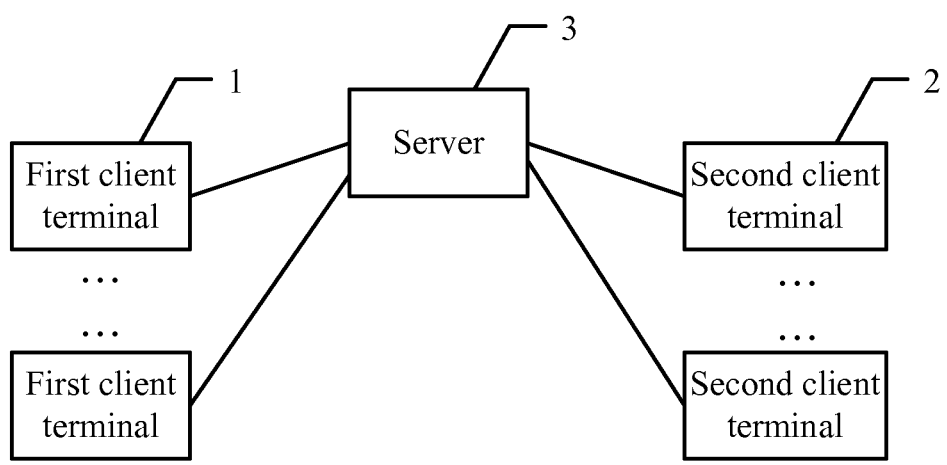
FIG. 6 is a schematic diagram illustrating a structure of a system according to an example of the present disclosure.

FIG. 6 is a schematic diagram illustrating a structure of a system according to an example of the present disclosure.

According to an example, the system includes a server 3, at least one first terminal device and at least one second terminal device. In the example, a first terminal device 1 and a second terminal device 2 are taken as examples.

The first terminal device 1 is to upload sharing information to the server 3.

The server 3 is to send identification information related to the sharing information to the first terminal device 1 according to the sharing information.

The first terminal device 1 is further to transform the identification information into a sound signal, and play the sound signal.

The second terminal device 2 is to, after receiving the sound signal, parse the sound signal to obtain identification information, and send a download request including the identification information to the server 3 to download the sharing information.

The server 3 is further to send the sharing information to the second terminal device 3 according to the download request and record information corresponding to the second terminal device 2 to a preconfigured user database.

According to an example, the terminal device 1 or the terminal device 2 may be a mobile terminal device, e.g. a laptop computer, a smart phone, a tablet PC. The terminal device includes hardware modules, e.g. a reproducer, a display and a processor. The server 3 may be an application server, e.g. an IM server or a SNS server.

The sharing information uploaded by the first terminal device 1 may be picture information, business card information, file information and etc. The first terminal device 1 may upload the sharing information to the server 3 via a network, e.g. a communication network or the Internet, under the control of a user.

After receiving the sharing information, the server 3 stores the sharing information in a sharing storage, and assigns the identification information for the sharing information of the first terminal device. The identification information includes a type and a storage address of the sharing information. The type of the sharing information may be a picture, a business card, a file and etc. According to an example, the identification information may 8 bytes of data.

The first terminal device 1 may transform the identification information into the sound signal by using preconfigured rules, e.g. a rule of alternating high and low frequency. According to an example, the identification information may be transformed into hexadecimal strings, then each string is transformed into one piece of sound signal with alternated high and low frequency, and finally a whole sound signal is generated.

The first terminal device 1 may play the sound signal by using a reproducer. For example, a mobile terminal device may play the sound signal by using a reproducer of the mobile terminal device.

According to an example, the first terminal device 1 device may play the sound signal for many times, so as to ensure that the second terminal device 2 can receive the whole sound signal.

According to an example, a start character and/or an end character may be added to the identification information, and then the identification information is transformed into the sound signal, so that the whole identification information may be obtained by the second terminal device according to the start character and/or the end character. According to another example, a sound signal with a certain frequency may be added to the sound signal transformed from the identification information, so as to indicate the start and the end of the identification information. The second terminal device determines when to start and when to stop decoding the received sound signal according to the sound signal with the certain frequency.

When needing to obtain the sharing information of the first terminal device 1, the user of the second terminal device 2 only needs to start a monitoring function of the second terminal device 2, so that the second terminal device 2 is at the monitoring state. The sound signal from the first terminal device 1 may be obtained via a sound module, e.g. a mike. After receiving the sound signal from the first terminal device 1, the second terminal device 2 transforms the sound signal into an electronic signal according to rules matching with rules used by the first terminal device 1 and thus obtains the identification information.

According to an example, the number of bytes in the identification information of the sharing information sent by the first terminal device 1 is pre-agreed by the first terminal device and other terminal devices. If the number of bytes in the identification information received by the second terminal device 2 is not equal to the pre-agreed number, it is indicated that the received identification information is not complete, and the received identification information is discarded. If the number of bytes in the identification information received by the second terminal device 2 is equal to the pre-agreed number, the download request including the identification information is generated and sent to the server 3, so as to download the sharing information corresponding to the identification information.

According to an example, the identification information configured by the server 3 has a unified standard format. If the format of the identification information received by the second terminal device 2 is different from the standard format, it is indicated that the received identification information is not complete, and the received identification information is discarded. If the format of the identification information received by the second terminal device 2 is the same as the standard format, the download request including the identification information is generated and sent to the server 3, so as to download the sharing information corresponding to the identification information.

According to an example, if the identification information carried by the sound signal played by the first terminal device 1 includes a identifier code and a check code, the second terminal device 2 parses the identification information and obtains the identifier code and the check code, and verifies the identifier code by using the check code, so as to obtain the complete identification information.

According to an example, the server 3 is further to search for and obtain the sharing information of the first terminal device 1 according to the identification information carried in the download request, send the sharing information to the second terminal device 2. The server 3 is further to obtain information corresponding to the second terminal device 2 according to a terminal identifier of the second terminal device 2.

According to an example, if the second terminal device 2 is registered as a sharing user in the server 3, the server 3 records the information of the second terminal device 2. If the second terminal device 2 is not registered as the sharing user, the server 3 does not record the information of the second terminal device 2.

The server 3 finds the sharing information corresponding to the storage address and the type according to the identification information included in the download request, and sends the sharing information to the second terminal device 2.

According to an example, if the second terminal device 2 is registered as a sharing user in the server 3, the server 3 automatically records the information of the second terminal device 2. According to an example, the information of the second terminal device 2 includes identification information of the second terminal device 2, e.g. a phone number of the second terminal device 2, sharing information uploaded to the server by the second terminal device 2.

According to an example, the user database may be configured after the first terminal device 1 uploads the sharing information. The user database stores information of terminal devices downloading the sharing information of the first terminal device in a list mode. After recording the information of all of the second terminal devices, the server may call an information sharing application, i.e. SNS, or an IM tool, to generate a group. Users of the terminal devices in the group may communicate with each other.

Further, the first terminal device 1 may be the terminal device described in the example shown in FIG. 3, the second terminal device 2 may be the terminal device described in the example shown in FIG. 4, the server 3 may be the terminal device described in the example shown in FIG. 5.

By using the solutions of the present disclosure, cumbersome operations for establishing data connection are avoided in the procedure of the sharing information, e.g. operations for establishing Bluetooth connection are avoid. Further, the user does not need to pay extra costs for sharing information, e.g. costs for SMS or MMS. Therefore, costs are saved for the user, and requirements of the user for automatically establishing a group are satisfied.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

The foregoing is only preferred examples of the present disclosure and is not used to limit the protection scope of the present disclosure. Any modification, equivalent substitution and improvement are within the protection scope of the present disclosure.

The invention claimed is:

1. A method for sharing information, comprising:
   uploading, by a first terminal device, sharing information to a server;
   assigning, by the server, identification information for the sharing information of the first terminal device, and sending the identification information to the first terminal device; the identification information comprising a type and a storage address of the sharing information, wherein the type of the sharing information comprises a picture, a business card and a file;
   transforming, by the first terminal device, the identification information into a sound signal, and playing the sound signal;
   receiving, by a second terminal device, the sound signal, parsing the sound signal to obtain the identification information, and sending a download request comprising the identifier information to the server;
   sending, by the server, the sharing information to the second terminal device according to the download request; and,
   recording, by the server, information corresponding to the second terminal device to a preconfigured user database.

2. The method of claim 1, wherein the second terminal device receiving the sound signal is in a monitoring state.

3. The method of claim 1, wherein transforming, by the first terminal device, the identification information into the sound signal comprises:
   encoding, by the first terminal device, the identification information and obtaining a identifier code and a check code of the identification information; and
   transforming, by the first terminal device, the identifier code and the check code into the sound signal.

4. The method of claim 3, wherein parsing, by the second terminal device, the sound signal to obtain the identification information comprises:
   transforming, by the second terminal device, the sound signal into an identifier code and a check code, and obtaining the identification information according to the identifier code and the check code.

5. The method of claim 1, wherein sending the download request comprising the identification information to the server comprises:
   determining, by the second terminal device, whether a current network is accessible, after obtaining the identification information; and sending, by the second terminal device, the download request comprising the identification information to the server, if the current network is accessible.

6. The method of claim 1, further comprising:
configuring a user database for recording download sharing information after receiving the sharing information sent by the first terminal device, the download sharing information being information of a user of a terminal device downloading the sharing information sent by the first terminal device.

7. The method of claim 1, wherein sending, by the server, the sharing information to the second terminal device according to the download request comprises:
searching, by the server, for the sharing information of the first terminal device according to the identification information comprised in the download request; and
sending, by the server, the sharing information of the first terminal device to the second terminal device.

8. The method of claim 1, wherein recording, by the server, the information corresponding to the second terminal device to the preconfigured user database comprises:
obtaining, by the server, the information of the second terminal device according to an terminal identifier of the second terminal device; and
storing, by the server, the information of the second terminal device in the user database.

9. The method of claim 6, further comprising:
sending, by the server, the download sharing information stored within a preconfigured time threshold in the user database to at least one of the first terminal device and the second terminal device.

10. A first terminal device for sharing information, comprising a memory and a processor communicating with the memory, wherein the memory stores instructions that when executed by the processor cause the processor to:
upload sharing information to a server and receive identification information related to the sharing information sent by the server, wherein the identification information comprises a type and a storage address of the sharing information, the type of the sharing information comprises a picture, a business card and a file;
transform the identification information into a sound signal;
play the sound signal; wherein the sound signal is parsed by a second terminal device receiving the sound signal, and the second terminal device sends a download request comprising identification information obtained according to the sound signal to the server to download the sharing information, wherein information corresponding to the second terminal device is recorded by the server to a preconfigured user database.

11. The first terminal device of claim 10, wherein the instructions further cause the processor to:

receive download sharing information stored within a preconfigured time threshold from the server, wherein the download sharing information is information of a user of the second terminal device downloading the sharing information;
store the download sharing information received.

12. A server for sharing information, comprising a memory and a processor communicating with the memory, wherein the memory stores instructions that when executed by the processor cause the processor to:
assign identification information for sharing information of a first terminal device, send the identification information related to the sharing information to the first terminal device, after receiving the sharing information sent by the first terminal device, wherein the identification information comprises a type and a storage address of the sharing information, the type of the sharing information comprises a picture, a business card and a file; and
send the sharing information to a second terminal device after receiving a download request comprising the identification information from the second terminal device, and record information corresponding to the second terminal device to a preconfigured user database.

13. The server of claim 12, wherein the instructions further cause the processor to:
configure a user database for recording download sharing information after receiving the sharing information, wherein the download sharing information comprises information of a terminal device downloading the sharing information sent by the first terminal device.

14. The server of claim 12, wherein the instructions further cause the processor to:
search for and obtain the sharing information of the first terminal device according to the identification information comprised in the download request; and
send the sharing information obtained to the second terminal device.

15. The server of claim 14, wherein
the information corresponding to the second terminal device recorded in the preconfigured user database is obtained, according to a terminal identifier of the second terminal device.

16. The server of claim 13, wherein the instructions further cause the processor to:
send the download sharing information stored within a preconfigured time threshold in the user database to at least one of the first terminal device and the second terminal device.

* * * * *